US008586236B2

(12) United States Patent
Kwak et al.

(10) Patent No.: US 8,586,236 B2
(45) Date of Patent: Nov. 19, 2013

(54) RECHARGEABLE BATTERY

(75) Inventors: Yoontai Kwak, Yongin-si (KR);
Yongsam Kim, Yongin-si (KR);
Kyuwon Cho, Yongin-si (KR)

(73) Assignees: Samsung SDI Co., Ltd., Yongin-si
(KR); Robert Bosch GmbH, Stuttgart
(DE)

( * ) Notice: Subject to any disclaimer, the term of this patent is extended or adjusted under 35 U.S.C. 154(b) by 304 days.

(21) Appl. No.: 12/855,417

(22) Filed: Aug. 12, 2010

(65) Prior Publication Data

US 2011/0135999 A1    Jun. 9, 2011

Related U.S. Application Data

(60) Provisional application No. 61/267,354, filed on Dec. 7, 2009.

(30) Foreign Application Priority Data

May 7, 2010    (KR) .................... 10-2010-0042961

(51) Int. Cl.
*H01M 2/22*        (2006.01)
*H01M 2/26*        (2006.01)
*H01M 10/04*       (2006.01)

(52) U.S. Cl.
USPC ................... 429/186; 429/163; 429/209

(58) Field of Classification Search
USPC .......... 429/129, 133, 135, 142, 163, 186, 209
See application file for complete search history.

(56) References Cited

U.S. PATENT DOCUMENTS

| 4,019,251 | A  | * | 4/1977  | McCole ................. 29/623.2 |
| 5,989,743 | A  |   | 11/1999 | Yamashita |
| 6,402,793 | B1 | * | 6/2002  | Miltich et al. ............ 29/25.03 |
| 2003/0044677 | A1 |   | 3/2003  | Naruoka |
| 2005/0287429 | A1 |   | 12/2005 | Cho et al. |
| 2006/0115722 | A1 |   | 6/2006  | Kim |
| 2006/0123609 | A1 | * | 6/2006  | Norton et al. ............ 29/25.03 |
| 2009/0104525 | A1 |   | 4/2009  | Nakagawa et al. |
| 2011/0045344 | A1 |   | 2/2011  | Kim |

FOREIGN PATENT DOCUMENTS

CN          1713441 A        12/2005

(Continued)

OTHER PUBLICATIONS

Office Action dated Jul. 2, 2012 issued in European Patent Application No. 10 193 953.6-1227, 4 pages.
English Machine Translation to Japanese Application No. 2008-041264, 23 pages.

(Continued)

*Primary Examiner* — Gregg Cantelmo
(74) *Attorney, Agent, or Firm* — Christie, Parker & Hale, LLP

(57)    ABSTRACT

A rechargeable battery includes a case; an electrode assembly housed in the case, wherein the electrode assembly includes a first electrode, a second electrode and a separator between the first electrode and the second electrode; and a support plate between the electrode assembly and the case, the support plate having a first conductive plate electrically coupled to the electrode assembly; wherein an insulation layer is between the first conductive plate and the electrode assembly and wherein an adhesive section is between the insulation layer and the first conductive plate.

19 Claims, 14 Drawing Sheets

(56) References Cited

FOREIGN PATENT DOCUMENTS

| | | |
|---|---|---|
| EP | 2 197 070 A1 | 6/2010 |
| EP | 2 330 661 A1 | 6/2011 |
| JP | 10-261428 | 9/1998 |
| JP | 2003-142068 | 5/2003 |
| JP | 2006-156401 | 6/2006 |
| JP | 2008-041264 | 2/2008 |
| KR | 10-2008-0005621 | 1/2008 |
| KR | 10-2008-0019311 A | 3/2008 |
| WO | WO 2009/041136 A1 | 4/2009 |
| WO | WO 2009149607 A1 * | 12/2009 |

OTHER PUBLICATIONS

Extended European Search Report dated Feb. 11, 2011 for EP Application No. 10193953.6, 5 pages.
Korean Office action dated Dec. 24, 2012 issued in Korean Patent Application No. 2010-0025204, 2 pages.
SIPO Office action dated Mar. 5, 2013, for corresponding Chinese Patent application 201010576984.X, (15 pages).
JPO Office action dated Oct. 30, 2012, for corresponding Japanese Patent application 2010-270089, (2 pages).
Patent Abstracts of Japan, and English machine translation for Japanese Publication 2003-142068, (16 pages).

* cited by examiner

RECHARGEABLE BATTERY

CROSS-REFERENCE TO RELATED APPLICATION

This application claims the benefit of U.S. Provisional Application No. 61/267,354, filed on Dec. 7, 2009, in the United States Patent and Trademark Office, and claims priority to Korean Patent Application No. 10-2010-0042961, filed on May 7, 2010, in the Korean Intellectual Property Office, the disclosures of which are incorporated herein in their entirety by reference.

TECHNICAL FIELD

Embodiments of the present invention relate to a rechargeable battery.

BACKGROUND ART

Generally, lithium ion rechargeable batteries are widely used as a power source for small-sized electronic devices such as notebook computers and cellular phones. Furthermore, since the lithium ion rechargeable batteries have high power, high capacity, and light weight when compared to other rechargeable batteries, they are also being used in hybrid and electric automobiles.

Lithium ion rechargeable batteries used as a power source of automobiles should satisfy safety and reliability requirements under the severest conditions. There are a plurality of test categories for safety, among which the three most extreme test categories are for puncture, collapse, and overcharge.

The puncture and collapse tests are performed to estimate rechargeable battery-related damage in the event of a car accident, and are thus very important test categories for safety. Specifically, in tests performed under extreme conditions such as a nail penetration test and a collapse test, the battery should not excessively increase in temperature.

SUMMARY

An aspect of the present invention provides a rechargeable battery in which an adhesion section and a non-adhesion section are defined on an insulation plate constituting a support plate to stably support the support plate as well as to improve the safety against puncture and collapse.

According to at least one embodiment, a rechargeable battery includes a case; an electrode assembly housed in the case, wherein the electrode assembly includes a first electrode, a second electrode and a separator between the first electrode and the second electrode; and a support plate between the electrode assembly and the case, the support plate having a first conductive plate electrically coupled to the electrode assembly; wherein an insulation layer is between the first conductive plate and the electrode assembly and wherein an adhesive section is between the insulation layer and the first conductive plate.

In one embodiment, the separator comprises the insulation layer and the insulation layer may be adhered to the first conductive plate. Further, the first conductive plate is adhered to the electrode assembly.

Additionally, the rechargeable battery may include a second conductive plate electrically coupled to the electrode assembly, wherein the insulation layer is between the first and second conductive plates. In one embodiment, the first electrode has a first coating portion containing an active material coated on the first plate and a first non-coating portion absent the active material and wherein the first conductive plate is electrically coupled to the first non-coating portion.

In embodiments, the adhesive section extends generally along at least one edge of at least one planar surface of the insulation layer and may or may not be continuous. Further, the adhesive section may be on two planar surfaces of the insulation layer and may extend generally from a first edge to a second edge of at least one planar surface of the insulation layer.

Further, the adhesive section may extend generally along two edges of at least one planar surface of the insulation layer. Further, the adhesive section may extend generally along four edges of at least one planar surface of the insulation layer. Further, the adhesive section may include adhesive on only corners of at least one planar surface of the insulation layer. Further, the insulation layer may include a non-adhesive surface having a substantially circular shape.

Further, the support plate may also include a second conductive plate electrically coupled to the electrode assembly. Further, the first conductive plate and the second conductive plate may include different materials. Further, the first conductive plate may include copper and the second conductive plate may include aluminum.

Further, the rechargeable battery may also include an additional support plate electrically coupled to the electrode assembly. Further, the rechargeable battery may also include an additional electrode assembly electrically coupled to the support plate. Further, the separator and the insulation plate may include substantially the same material.

In the rechargeable battery according to an embodiment, since the adhesion sections are disposed on both side surfaces of the insulation plate of the support plate, the first conductive plate and the second conductive plate of the support plate are stably supported. Also, since the non-adhesion sections are disposed on both ends of the insulation plate, the safety against puncture and collapse may be improved.

In the rechargeable battery according to an embodiment, since the support plate is disposed between the electrode assembly and the case, the support plate is firstly short-circuited when the rechargeable battery is punctured or collapsed. That is, when the rechargeable battery is punctured or collapsed, the rechargeable battery may be in a short-circuit state similar to that in which the rechargeable battery is short-circuited due to the external short circuit. Since the support plate has a very low electric resistance, the heat is not nearly generated and the large current is quickly consumed when the safety is short-circuited. As a result, since the heat is not nearly generated when the rechargeable battery is punctured or collapsed, the safety and reliability of the rechargeable battery may be improved.

Since the support plate according to the embodiments is disposed in a relatively thick plate shape between the electrode assembly and the case, the support plate supports the electrode assembly to prevent the case from being swelled.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
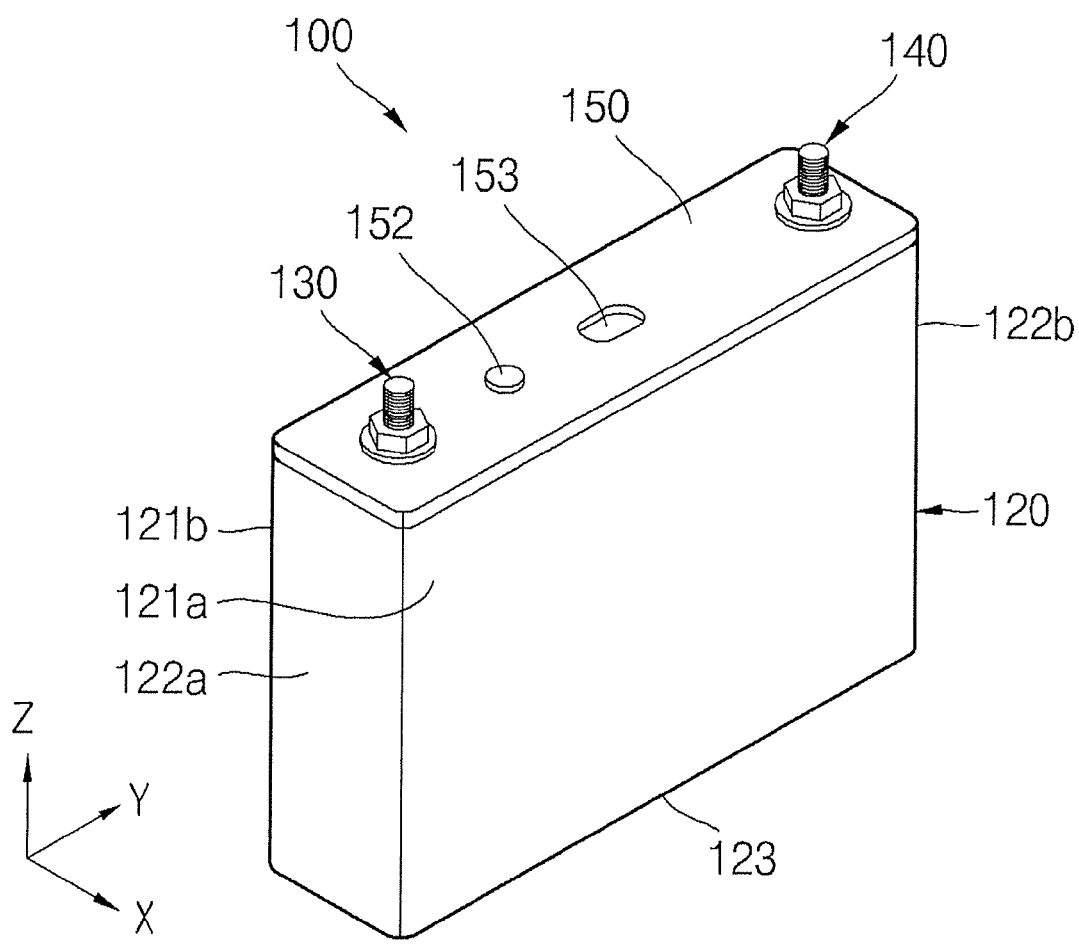
FIGS. 1A through 1C illustrate perspective, longitudinal sectional, and cross sectional views of a rechargeable battery according to an embodiment, respectively.
Figure 1B:
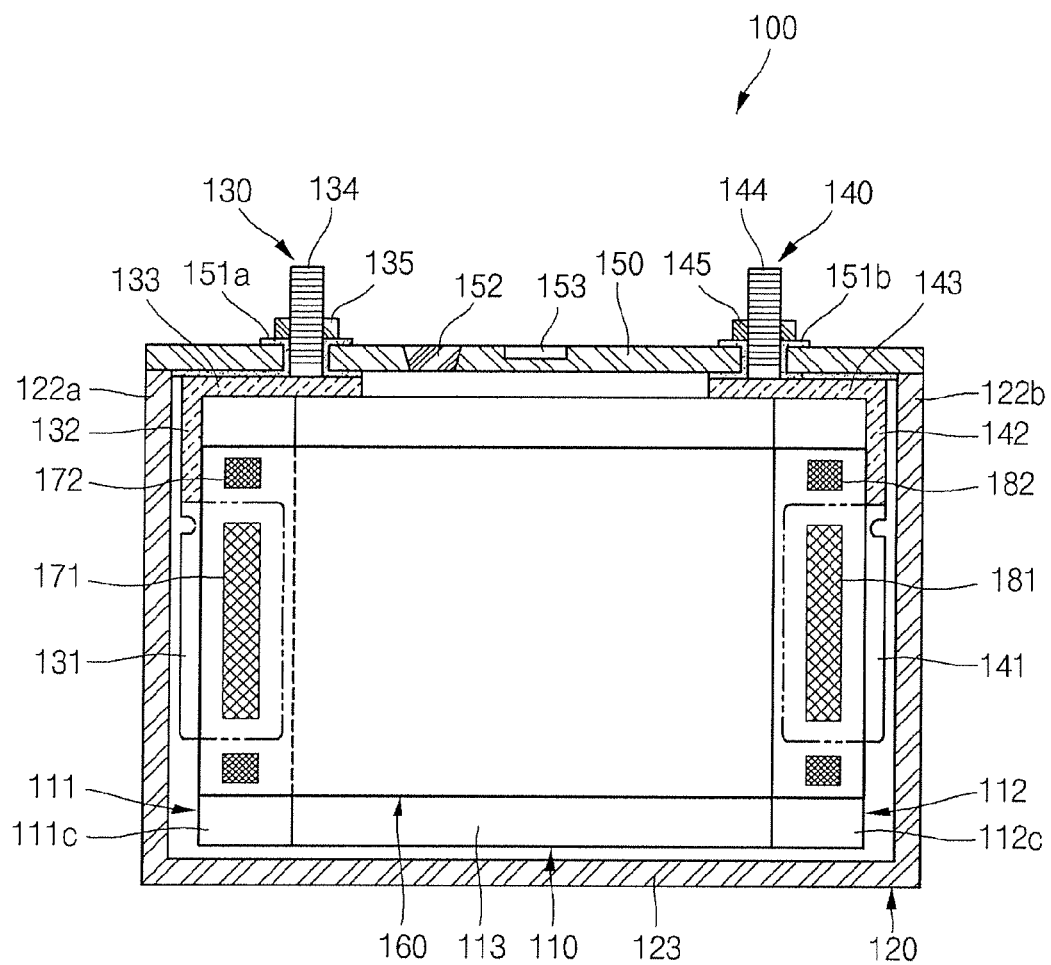
Figure 1C:
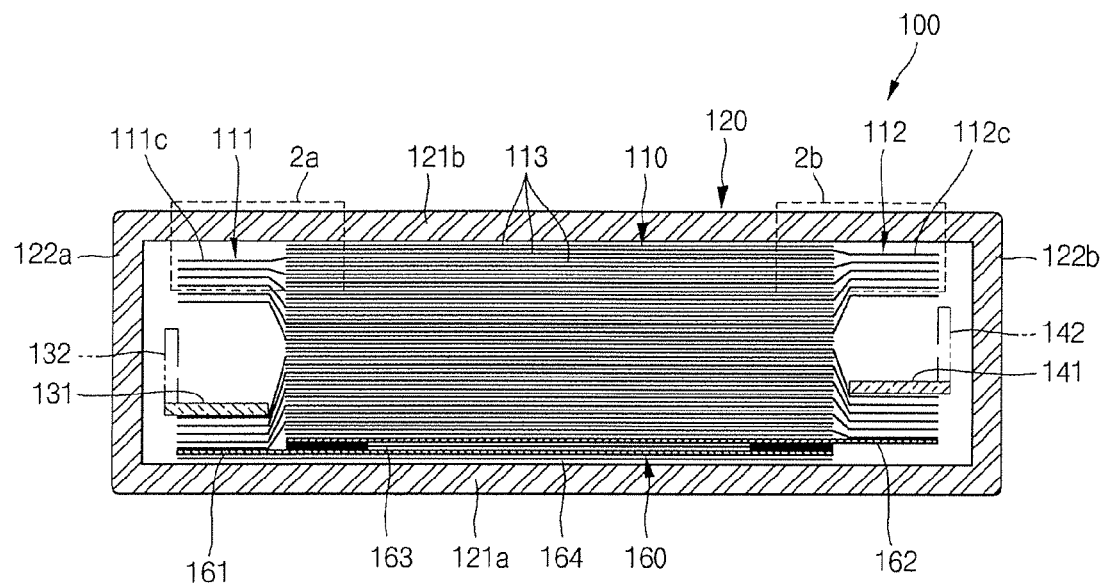

FIGS. 1A to 1C illustrate perspective, longitudinal sectional, and cross sectional views of a rechargeable battery according to an embodiment, respectively.

A rechargeable battery 100 according to an embodiment includes an electrode assembly 110, a case 120, a first electrode terminal 130, a second electrode terminal 140, a cap plate 150, and a support plate 160. The case 120 may be a can.

The electrode assembly 110 includes a first electrode 111, a second electrode 112, and a separator 113. The electrode assembly 110 may be wound in an approximately jelly-roll type or may be a stacked shape. The first electrode 111 may be a positive electrode plate, and the second electrode 112 may be a negative electrode plate. On the other hand, the first electrode 111 may be a negative electrode plate, and the second electrode 112 may be a positive electrode plate. The first electrode 111 includes a first metal foil and a first active material. When the first electrode 111 is the positive electrode plate, the first metal foil may be formed of aluminum, and the first active material may be lithium-based oxide. Also, the second electrode 112 includes a second metal foil and a second active material. When the second electrode 112 is the negative electrode plate, the second metal foil may be formed of copper, and the second active material may be graphite. However, embodiments of the present invention are not limited to these materials. The separator 113 is located between the first electrode 111 and the second electrode 112. The separator 113 may be formed of one of any materials such as porous polyethylene (PE) and polypropylene (PP) or its equivalent, but is not limited thereto. The separator may be substantially on both side surfaces of the first electrode 111 or the second electrode 112. The separator 113 is located at an outermost side to prevent a portion of the electrode assembly 110 from being short-circuited to the case 120, the cap plate 150, and the support plate 160.

Furthermore, the first electrode 111 may include a first non-coating portion 111c on which a positive electrode active material is not coated. The first non-coating portion 111c may protrude through one side of the separator 113 to the outside. Also, the second electrode 112 may include a second non-coating portion 112c on which a negative electrode active material is not coated. The second non-coating portion 112c may protrude through the other side of the separator 113 to the outside. That is, the first non-coating portion 111c and the second non-coating portion 112c may protrude in directions opposite to each other with respect to the separator 113.

The case 120 has two wide side surfaces 121a and 121b, two narrow side surfaces 122a and 122b, and one bottom surface 123. Also, the case 120 has an opened upper side. The electrode assembly 110 is received into the case 120 together with an electrolyte. At this time, the first non-coating portion 111c and the second non-coating portion 112c of the electrode assembly 110 face the two narrow side surfaces 122a and 122b, respectively. Also, the case 120 may be formed of one of any materials such as aluminum, copper, iron, SUS, ceramic, and polymer, or equivalents thereof, but is not limited thereto.

The first electrode terminal 130 and the second electrode terminal 140 are electrically coupled to the first electrode 111 and the second electrode 112 of the electrode assembly 110, respectively. That is, the first electrode terminal 130 may be welded to the first electrode 111, and the second electrode terminal 140 may be welded to the second electrode 112. Furthermore, the first electrode terminal 130 may be welded to the first non-coating portion 111c of the first electrode 111. Also, the second electrode terminal 140 may be welded to the second non-coating portion 112c of the second electrode 112.

The first electrode terminal 130 includes a weld part 131, a first extension part 132, a second extension part 133, and a bolt extension part 134. The weld part 131 is inserted into the first electrode 111 of the electrode assembly 110, i.e., the first non-coating portion 111c. Also, the second electrode terminal 140 includes a weld part 141, a first extension part 142, a second extension part 143, and a bolt extension part 144. The weld part 141 is inserted into the second electrode 112 of the electrode assembly 110, i.e., the second non-coating portion 112c. Furthermore, each of the bolt extension parts 134 and 144 of the first electrode terminal 130 and the second electrode terminal 140 passes through the cap plate 150 to protrude to the outside.

The cap plate 150 covers the case 120 and is configured to allow the first electrode terminal 130 and the second electrode terminal 140 to protrude to the outside. Here, a boundary between the cap plate 150 and the case 120 may be welded using a laser. In addition, each of the bolt extension parts 134 and 144 of the first electrode terminal 130 and the second electrode terminal 140 passes through the cap plate 150, and insulation materials 151a and 151b may be on an outer circumference of the bolt extension parts 134 and 144, respectively. Thus, the first electrode terminal 130 and the second electrode terminal 140 are electrically insulated from the cap plate 150. Due to this configuration, the case 120 and the cap plate 150 has a property of electrical neutrality. That is, the case 120 and the cap plate 150 may not have a polarity (positive or negative pole). However, as described below, in some cases, the case 120 and the cap plate 150 may be polarized.

Nuts 135 and 145 are coupled to the bolt extension parts 134 and 144 of the first electrode terminal 130 and the second electrode terminal 140, respectively. Thus, the first electrode terminal 130 and the second electrode terminal 140 are firmly fixed to the cap plate 150. Furthermore, an electrolyte plug 152 may be coupled to the cap plate 150. Also, a safety vent 153 having a relatively thin thickness may be located on the cap plate 150. The cap plate 150 may be formed of the same material as the case 120.

The support plate 160 is located between the electrode assembly 110 and the case 120. That is, the support plate 160 is located between the electrode assembly 110 and at least one wide side surface 121a of the case 120.

The support plate 160 includes a first conductive plate 161, a second conductive plate 162, and an insulation plate 163 located between the first conductive plate 161 and the second conductive plate 162. The first conductive plate 161 is electrically coupled to the first non-coating portion 111c of the first electrode 111. In one embodiment, the first conductive plate 161 is welded to the first non-coating portion 111c. The second conductive plate 162 is electrically coupled to the second non-coating portion 112c of the second electrode 112. In one embodiment, the second conductive plate 162 is welded to the second non-coating portion 112c. The insulation plates 163 prevents or reduces the likelihood that the first conductive plate 161 and the second conductive plate 162 will be electrically short-circuited to each other until the support plate 160 is activated. Furthermore, an insulation plate 164 is located between the support plate 160 and the case 120. The insulation plate 164 prevents or reduces the likelihood that the first conductive plate 161 and the case 120 will be electrically short-circuited to each other until the support plate 160 is activated. Furthermore, as described below, an adhesion section and a non-adhesion section are located on a surface of the insulation plate 162 facing the first conductive plate 161 and the second conductive plate 162. Thus, the first conductive plate 161 and the second conductive plate 162 may be stably supported and may have improved safety against puncture and collapse.

A reference numeral 171 of FIG. 1B represents a welded mark at which the first non-coating portion 111c of the first electrode 111 of the electrode assembly 110, the weld part 131 of the first electrode terminal 130, and the first conductive plate 161 of the support plate 160 are welded together. A reference numeral 172 represents a welded mark at which the first non-coating portion 111c of the first electrode 111 of the electrode assembly 110 and the first conductive plate 161 of the support plate 160 are welded together.

A reference numeral 181 of FIG. 1B represents a welded mark at which the second non-coating portion 112c of the second electrode 112 of the electrode assembly 110, the weld part 141 of the second electrode terminal 140, and the second conductive plate 162 of the support plate 160 are welded together. A reference numeral 182 represents a welded mark at which the second non-coating portion 112c of the second electrode 112 of the electrode assembly 110 and the second conductive plate 162 of the support plate 160 are welded together.

As described above, when the rechargeable battery 100 is punctured or collapsed, the insulation plate 163 is torn or damaged to electrically short-circuit the first conductive plate 161 and the second conductive plate 162 of the support plate 160. Since the first conductive plate 161 and the second conductive plate 162 of the support plate 160 have a relatively low electric resistance, minimal heat is generated and a large current is quickly consumed when they are short-circuited. As a result, since only minimal heat is generated when the rechargeable battery 100 is punctured or collapsed, safety and reliability of the rechargeable battery 100 may be improved.

Also, since the support plate 160 according to an embodiment has a relatively thick plate shape between the electrode assembly 110 and the case 120, the support plate 160 may support the electrode assembly 110 and prevent the case 120 from swelling.

Figure 2A:
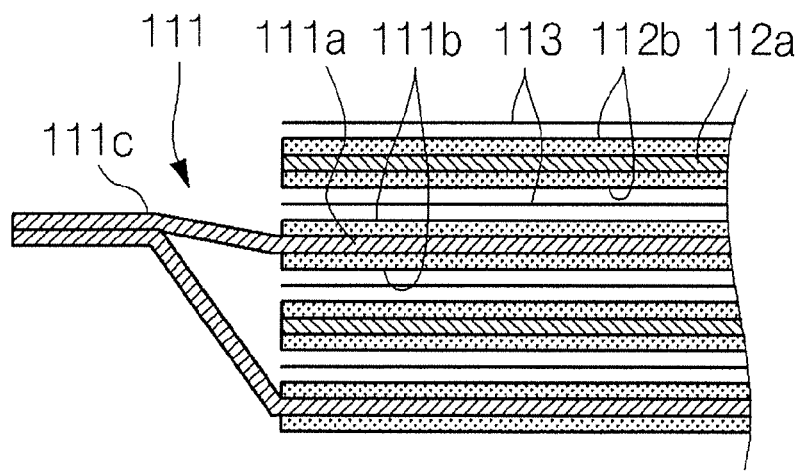
FIGS. 2A and 2B illustrate enlarged views of portions 2a and 2b of FIG. 1C.
Figure 2B:
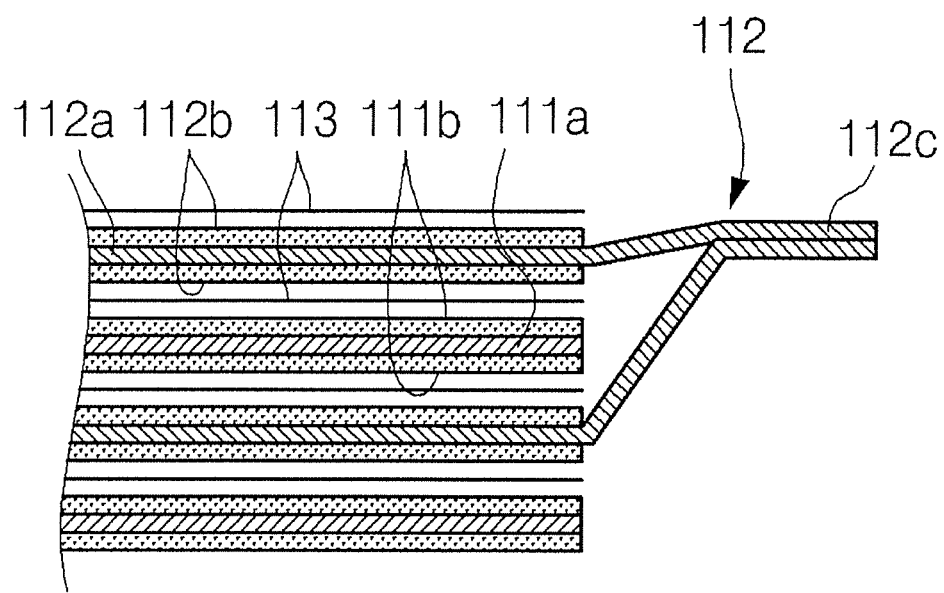

FIGS. 2A and 2B illustrate enlarged views of portions 2a and 2b of FIG. 1C.

Referring to FIG. 2A, the electrode assembly 110 includes the first electrode 111. The first electrode 111 includes a first metal foil 111a (e.g., aluminum foil or aluminum mesh), a first active material 111b (e.g., lithium-based oxide), and the first non-coating portion 111c on which a first active material is not coated.

Also, the electrode assembly 110 includes the second electrode 112. The second electrode 112 includes a second metal foil 112a (e.g., copper foil), a second active material 112b (e.g., graphite), and the second non-coating portion 112c on which a second active material is not coated. Furthermore, the separators 113 formed of PP or PE are on both side surfaces of the first electrode 111, and the separators 113 formed of PP or PE are on both side surfaces of the second electrode 112.

Here, the first non-coating portion 111c extends through one side of the separator 113 to the outside. The first non-coating portions 111c are closely attached and welded to each other to improve the weldability between the weld part 131 of the first electrode terminal 130 and the first conductive plate 161 of the support plate 160.

Also, the second non-coating portion 112c extends through the other side of the separator 113 to the outside. The second non-coating portions 112c are closely attached and welded to each other to improve weldability between the weld part 141 of the second electrode terminal 140 and the second conductive plate 162 of the support plate 160.

Figure 3A:
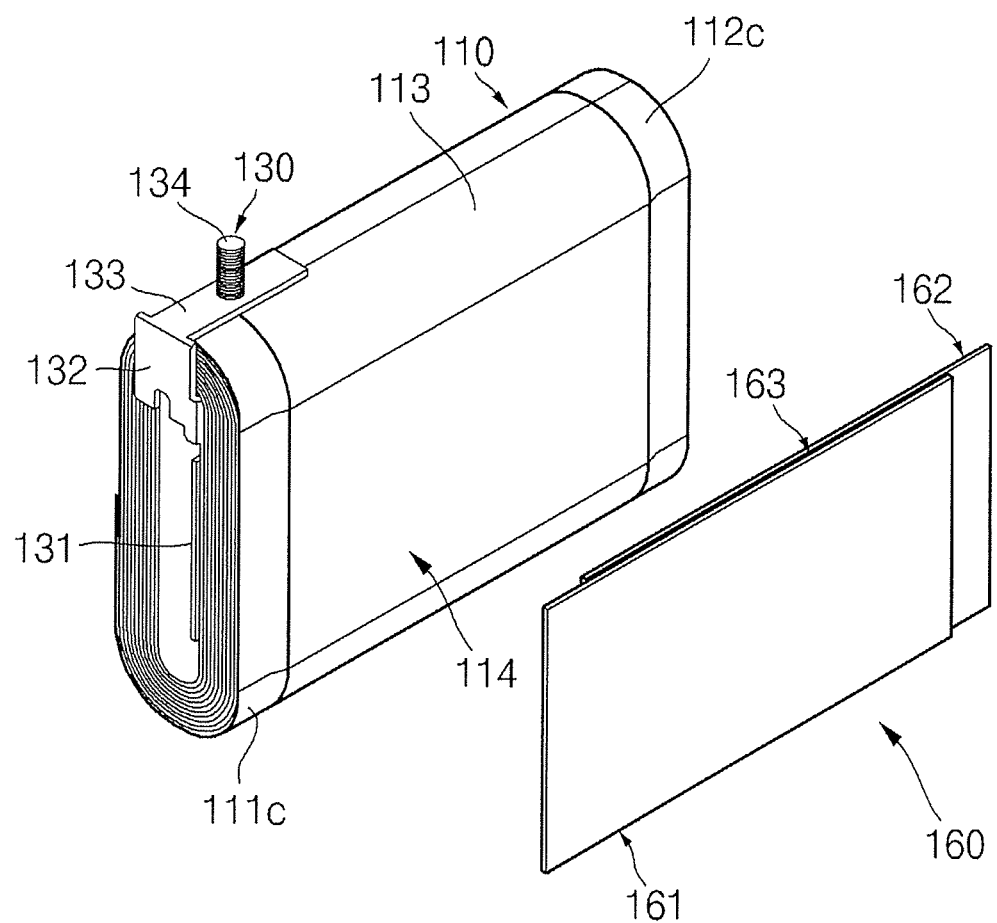
FIGS. 3A and 3B illustrate perspective views of a relationship between an electrode assembly and a support plate in a rechargeable battery according to an embodiment.
Figure 3B:
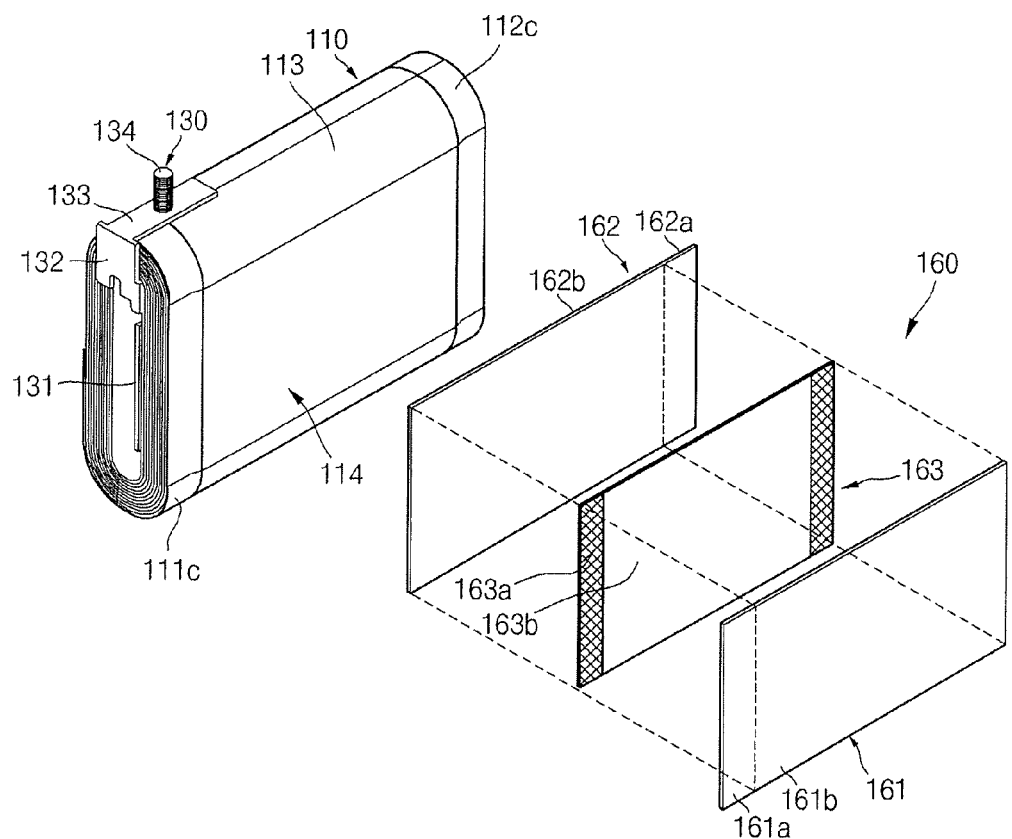

FIGS. 3A and 3B illustrate perspective views of a relationship between an electrode assembly and a support plate in a rechargeable battery according to an embodiment.

Referring to FIGS. 3A and 3B, a support plate 160 includes a first conductive plate 161 electrically coupled to a first non-coating portion 111c of the first electrode 111, a second conductive plate 162 electrically coupled to a second non-coating portion 112c of a second electrode 112, and an insulation plate 163 located between the first conductive plate 161 and the second conductive plate 162.

The first conductive plate 161 includes a first section 161a welded to the first non-coating portion 111c of an electrode assembly 110 and a second section 161b extending from the first section 161a and covering a front wide side surface 114 of the electrode assembly 110. Here, the first section 161a has a horizontal width nearly equal to that of the first non-coating portion 111c, and the second section 161b has a horizontal width nearly equal to that of the front wide side surface 114 of the electrode assembly 110. Also, since the first section 161a is directly welded to the first non-coating portion 111c, the first section 161a is electrically coupled to the first non-coating portion 111c. Furthermore, the second section 161b nearly covers the front wide side surface 114 of the electrode assembly 110 to improve the safety of the rechargeable battery against puncture or collapse.

The first conductive plate 161 may be formed of aluminum (Al) or copper (Cu), but is not limited thereto. When the first non-coating portion 111c is formed of aluminum, the first conductive plate 161 may also be formed of aluminum. Further, the first conductive plate 161 may have a thickness of about 50 μm to about 400 μm. Within the range of the thickness value, a temperature increase of the rechargeable battery is relatively low when the rechargeable battery is short-circuited due to a puncture or collapse. In addition, although the first conductive plate 161 is provided in one sheet in this embodiment, the first conductive plate 161 may be provided in plurality.

The insulation plate 163 is located between the first conductive plate 161 and the second conductive plate 162. The insulation plate 163 has a square shape having approximately four sides. Also, the insulation plate 163 may have an area equal to or greater than an area of the second section 161b of the first conductive plate 161 or a second section 162b of the second conductive plate 162. Further, the insulation plate 163 may be formed of the same material as the separator, such as PE or PP, but is not limited thereto.

The insulation plate 163 has adhesion sections 163a and non-adhesion sections 163b on both side surfaces thereof, each of which faces either the second section 161b of the first conductive plate 161 or the second section 162b of the second conductive plate 162. For example, the adhesion sections 163a may be located along each side facing each other. For example, as shown in FIG. 3B, the adhesion sections 163a may be vertically oriented along both sides facing each other in a horizontal direction (the "horizontal direction" being defined as shown in the drawing). Each of the non-adhesion sections 163b are located inside the adhesion sections 163a facing each other. The adhesion section 163a represents a section on which an adhesive is coated, and the non-adhesion section 163b represent a section on which the adhesive is not coated to expose the insulation plate 163.

The adhesion section 163a on the insulation plate 163 is adhered to the first conductive plate 161 and the second conductive plate 162 to support the first conductive plate 161 and the second conductive plate 162. That is, a portion of the second section 161b of the first conductive plate 161 is adhered to the adhesion section 163a on a surface of a side of the insulation plate 163, and a portion of the second section 162b of the second conductive plate 162 is adhered to the adhesion section 163a on a surface of the other side of the insulation plate 163.

Also, the first conductive plate 161 and the second conductive plate 162 are not adhered to the non-adhesion sections 163b on the insulation plate 163. That is, the second section 161b of the first conductive plate 161 faces the non-adhesion section 163b on the one side of the insulation plate 163, and the second section 162b of the second conductive plate 162 faces the non-adhesion section 163b on the other side of the insulation plate 163. The non-adhesion sections of the insulation plate 163 are easily torn or damaged when the support plate 160 is operated to easily short-circuit the first conductive plate 161 and the second conductive plate 162. Accordingly, since foreign substances (e.g., adhesive) do not exist between the insulation plate 163 and the first conductive plate 161 and between the insulation plate 163 and the second conductive plate 162, a contact resistance between the first conductive plate 161 and the second conductive plate 162 is significantly low.

The second conductive plate 162 includes a first section 162a welded to the second non-coating portion 112c of the electrode assembly 110 and a second section 162b extending from the second section 162a and covering the front wide side surface 114 of the electrode assembly 110. Here, the first section 162a has a horizontal width nearly equal to that of the second non-coating portion 112c, and the second section 162b has a horizontal width nearly equal to that of the front wide side surface 114 of the electrode assembly 110. Also, since the first section 162a is directly welded to the second non-coating portion 112c, the first section 162a is electrically coupled to the second non-coating portion 112c. Furthermore, the second section 162b nearly covers the front wide side surface 114 of the electrode assembly 110 to improve the safety of the rechargeable battery against puncture or collapse. The second conductive plate 162 may be formed of aluminum (Al) or copper (Cu), but is not limited thereto. When the second non-coating portion 112c is formed of copper, the second conductive plate 162 may be formed of copper. Also, the second conductive plate 162 may have a thickness of about 50 μm to about 400 μm. Within the range of the thickness value, a temperature increment of the rechargeable battery is relatively low when the rechargeable battery is short-circuited due to the puncture or collapse. In addition, although the second conductive plate 162 is provided in one sheet in this embodiment, the second conductive plate 162 may be provided in plurality.

Figure 4:
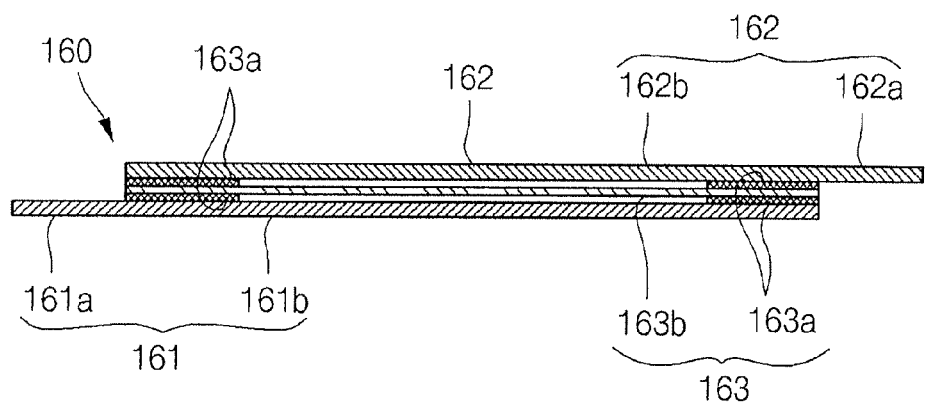
FIG. 4 illustrates a cross sectional view of a support plate in a rechargeable battery according to an embodiment.

FIG. 4 illustrates a cross sectional view of a support plate in a rechargeable battery according to an embodiment.

Referring to FIG. 4, in the support plate 160, the first conductive plate 161 is on a surface of a side of the insulation plate 163, and the second conductive plate 162 is on a surface of the other side of the insulation plate 163 with respect to the insulation plate 163.

A portion of the second section 161b of the first conductive plate 161 is adhered and fixed to the adhesion section 163a on both ends of the surface of the one side of the insulation plate 163. Also, a portion of the second section 162b of the second conductive plate 162 is adhered and fixed to the adhesion section 163a on both ends of the surface of the other side of the insulation plate 163.

Also, the remaining section of the second section 161b of the first conductive plate 161 directly faces the non-adhesion section 163b on an approximately central portion of the surface of the one side of the insulation plate 163 and the remaining section of the second section 162b of the second conductive plate 162 directly faces the non-adhesion section 163b disposed on an approximately central portion of the surface of the other side of the insulation plate 163.

As described above, when the sections corresponding to the non-adhesion sections 163b of the support plate 160 are punctured or collapsed, the first conductive plate 161 and the second conductive plate 162 have relatively low resistances, and thus are short-circuited from each other. Thus, the reliability of the support plate 160 may be improved. However, when the sections corresponding to the adhesion sections 163a of the support plate 160 are punctured or collapsed, the first conductive plate 161 and the second conductive plate 162 have relatively larger resistances, and thus are short-circuited from each other because of the adhesive between the insulation plate 163 and the first conductive plate 161 and between the insulation plate 163 and the second conductive plate 162.

Thus, when the adhesion section 163a has a wide area, the support plate 160 may be effectively supported. Also, when the non-adhesion section has a wide area, the operation reliability of the support plate 160 may be improved.

Figure 5A:
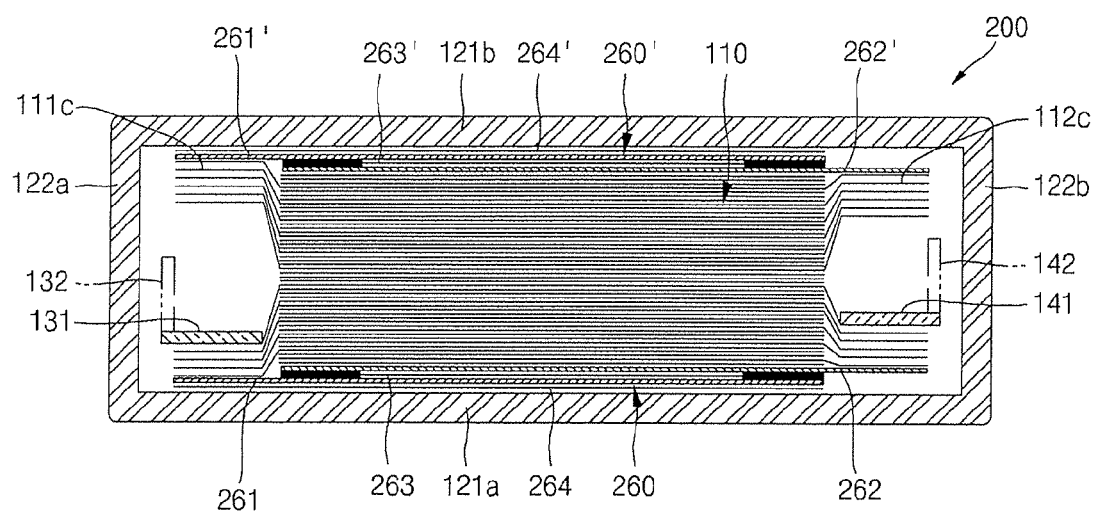
FIGS. 5A and 5B illustrate a cross sectional view of a rechargeable battery and an exploded perspective view of a relationship between an electrode assembly and a support plate according to another embodiment, respectively.
Figure 5B:
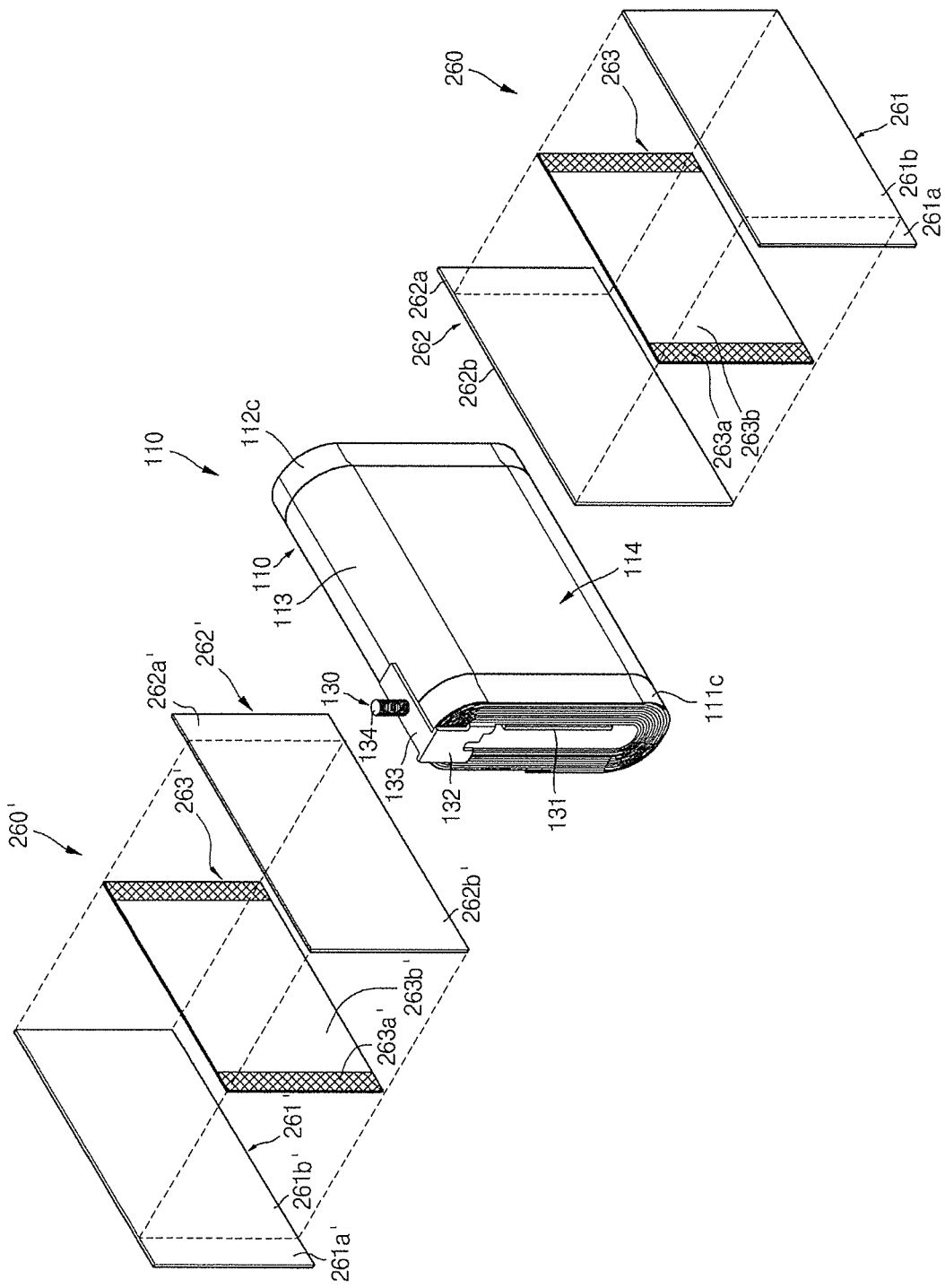

FIGS. 5A and 5B illustrate a cross sectional view of a rechargeable battery and a perspective view of a relationship between an electrode assembly and a support plate according to another embodiment, respectively.

Referring to FIGS. 5A and 5B, a rechargeable battery 200 according to an embodiment may include two support plates 260 and 260'. More specifically, the first support plate 260 may be located on a front wide side surface 114 of an electrode assembly 110, and the second support plate 260' may be located on a rear wide side surface of the electrode assembly 110. As above described, the first and second support plates 260 and 260' include first conductive plates 261 and 261' and second conductive plates 262 and 262', and insulation plates 263 and 263', respectively.

Furthermore, the first conductive plates 261 and 261' of the first and second support plates 260 and 260' are electrically coupled to a first non-coating portion 111c, and the second conductive plates 262 and 262' are electrically coupled to a second non-coating portion 112c.

In one embodiment, the first conductive plates 261 and 261' including first sections 261a and 261a' and second sections 261b and 261b', the second conductive plates 262 and 262' including first sections 262a and 262a' and second sections 262b and 262b', and the insulation plates 263 and 263' including adhesion sections 263a and 263a' and non-adhesion sections 263b and 263b' have substantially the same configuration and interrelationship as those of the above-described embodiment. Thus, their duplicated descriptions will be omitted.

As described above, in the rechargeable battery 200 according to this embodiment, since the support plates 260 and 260' are located between an electrode assembly 110 and the front wide side surface 121a of a case 120 as well as between the electrode assembly 110 and the rear wide side surface 121b of the case 120, the rechargeable battery 200 has improved safety against puncture and collapse.

In addition, since the support plates 260 and 260' are located at front and rear sides of the electrode assembly 110, respectively, they may effectively prevent the rechargeable battery from swelling.

Figure 6:
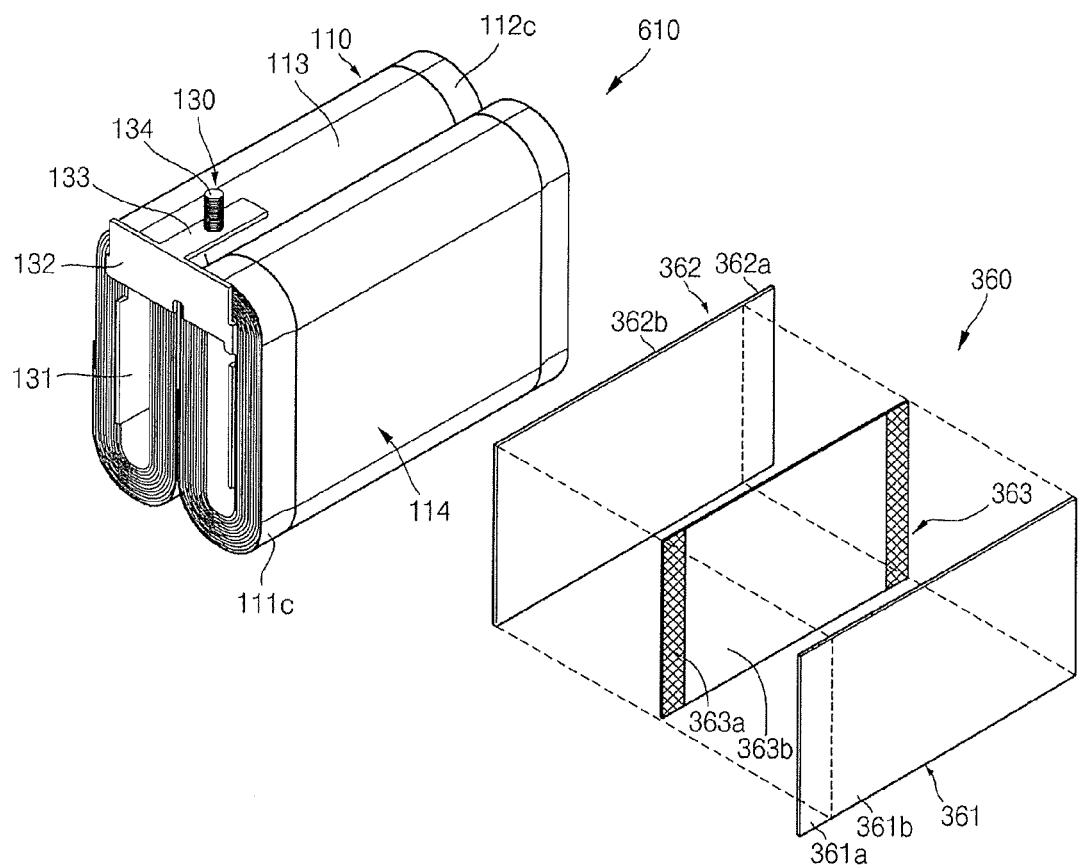
FIG. 6 illustrates an exploded perspective view of a relationship between an electrode assembly and a support plate in a rechargeable battery according to another embodiment.

FIG. 6 illustrates an exploded perspective view of a relationship between an electrode assembly and a support plate in a rechargeable battery according to another embodiment.

Referring to FIG. 6, two or more electrode assemblies 610 may be provided. A first electrode terminal 130 and a second electrode terminal are electrically coupled to the two or more electrode assemblies 610. For example, the first electrode terminal 130 may include a weld part 131, a first extension part 132, a second extension part 133, and a bolt extension part 134. Also, the first electrode terminal 130 is electrically coupled to a first non-coating portion 111c on each of the two electrode assemblies 610. The second electrode terminal has the same structure as the first electrode terminal. The second electrode terminal is electrically coupled to a second non-coating portion 112c on each of the two electrode assemblies 610.

A support plate 360 may be located on any one front wide side surface 114 of the two electrode assemblies 610. The support plate 360 includes a first conductive plate 361, a second conductive plate 362, and an insulation plate 363. Also, the insulation plate 363 includes an adhesion section 363a and a non-adhesion section 363b. Substantially, the support plate 360 is located between any of front wide side surfaces 114 of the two electrode assemblies 610 and a case.

As above-described, another embodiment may provide a rechargeable battery having large-capacity as well as improved safety against puncture and collapse. In addition, the configuration may effectively prevent the rechargeable battery from swelling.

Figure 7:
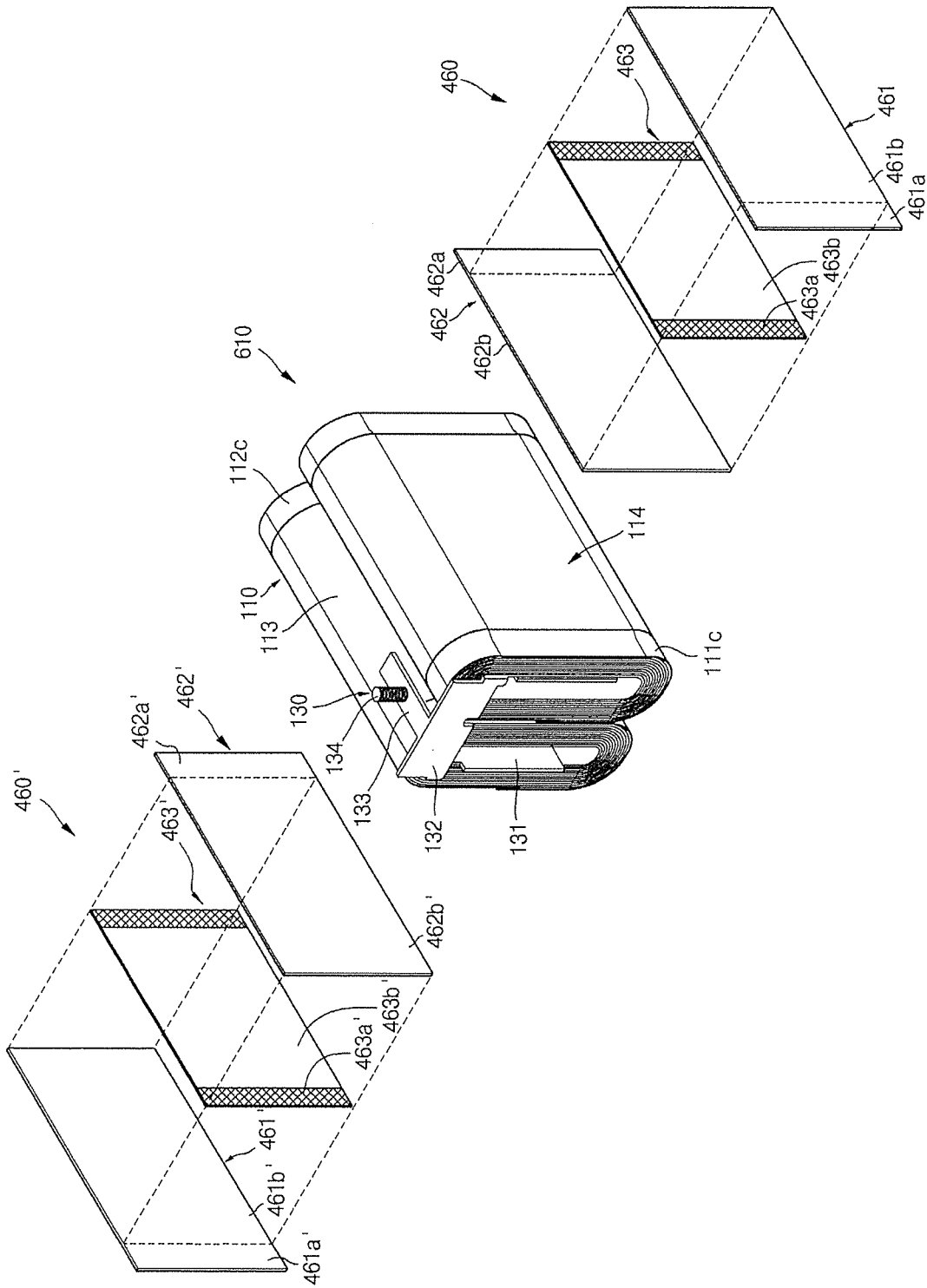
FIG. 7 illustrates an exploded perspective view of a relationship between an electrode assembly and a support plate in a rechargeable battery according to another embodiment.

FIG. 7 illustrates an exploded perspective view of a relationship between an electrode assembly and a support plate in a rechargeable battery according to another embodiment.

Referring to FIG. 7, two or more electrode assemblies 610 may be provided. A first electrode terminal 130 and a second electrode terminal are electrically coupled to the two or more electrode assemblies 610.

A first support plate 460 may be on any one front wide side surface 114 of the two electrode assemblies 610, and a second support plate 460' may be on the other rear wide side surface of the two electrode assemblies 610. The first support plate 460 includes a first conductive plate 461, a second conductive plate 462, and an insulation plate 463. The second support plate 460' includes a first conductive plate 461', a second conductive plate 462', and an insulation plate 463'. Also, the insulation plate 463 includes an adhesion section 463a and a non-adhesion section 463b, and the insulation plate 463' includes an adhesion section 463a' and a non-adhesion section 463b'.

As above-described, since the first support plate 460 is located between the electrode assembly and the front wide side surface of a case and the second support plate 460' is located between the electrode assembly and the rear wide side surface of the case, a rechargeable battery having the further improved safety against puncture and collapse may be provided. In addition, the swelling of the rechargeable battery may be prevented.

Figure 8:
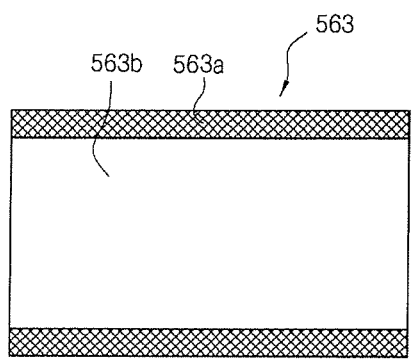
FIG. 8 illustrates a plan view of an example of an adhesion section and a non-adhesion section according to another embodiment.

FIG. 8 illustrates a plan view of an example of an adhesion section and a non-adhesion section, which are located on both surfaces of an insulation plate of a rechargeable battery according to an embodiment.

Referring to FIG. 8, an insulation plate 563 according to another embodiment has a square shape having approximately four sides. Also, adhesion sections 563a may be disposed along both sides facing each other. For example, the adhesion sections 563a may be vertically disposed along both sides facing each other in a horizontal direction. Also, each of non-adhesion sections 163b are disposed inside the adhesion sections 563a facing each other. As described above, the adhesion section 563b represents a section on which an adhesive is coated, and the non-adhesion section 563b represents a section on which the adhesive is not coated.

Figure 9:
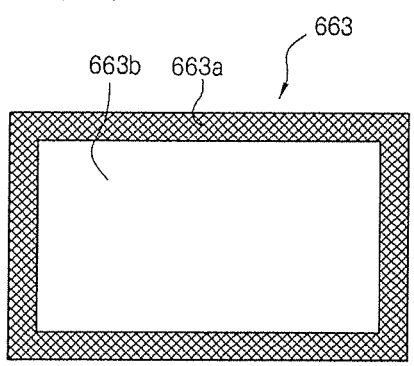
FIG. 9 illustrates a plan view of another example of an adhesion section and a non-adhesion section according to yet another embodiment.

FIG. 9 illustrates a plan view of another example of an adhesion section and a non-adhesion section, which are located on two surfaces of an insulation plate of a rechargeable battery according to an embodiment.

Referring to FIG. 9, an insulation plate 663 according to another embodiment has a square shape having four sides. An adhesion section 663a may be located along the four sides. Thus, the adhesion section 663a may have a square-shaped periphery. Also, a non-adhesion section 663b may be surrounded by the adhesion section 663a having the square line shape.

Figure 10:
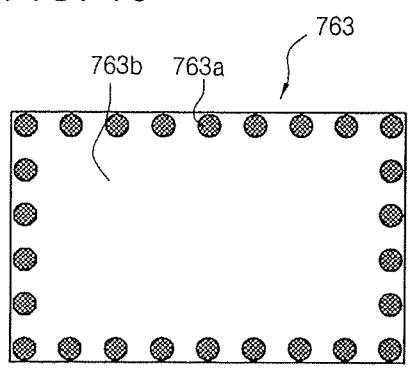
FIG. 10 illustrates a plan view of another example of an adhesion section and a non-adhesion section according to still another embodiment.

FIG. 10 illustrates a plan view of another example of an adhesion section and a non-adhesion section, which are on two surfaces of an insulation plate of a rechargeable battery according to an embodiment.

Referring to FIG. 10, an insulation plate 763 according to another embodiment has a square shape having four sides. Also, adhesion sections 763a may have certain pitches along the four sides and circular shapes spaced from each other. A non-adhesion section 763b may be located outside the adhesion sections 763a having the pitches and spaced from each other.

Figure 11:
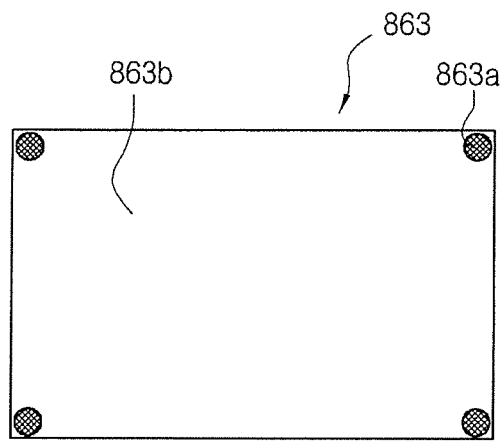
FIG. 11 illustrates a plan view of another example of an adhesion section and a non-adhesion section according to still yet another embodiment.

FIG. 11 illustrates a plan view of another example of an adhesion section and a non-adhesion section, which are on two surfaces of an insulation plate of a rechargeable battery according to an embodiment.

Referring to FIG. 11, an insulation plate 863 according to another embodiment has a square shape having four sides. Also, adhesion sections 863a are located at four corners at which the sides adjacent to each other are met, and each of the adhesion sections 863a has a circular shape. A non-adhesion section 863b may be located outside the adhesion sections 863a at the corners.

Figure 12:
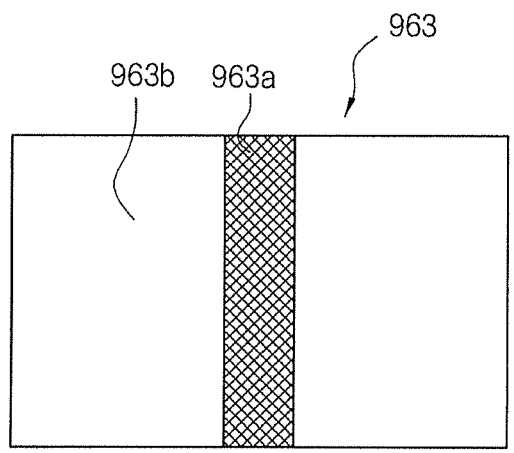
FIG. 12 illustrates a plan view of another example of an adhesion section and a non-adhesion section according to yet another an embodiment.

FIG. 12 illustrates a plan view of another example of an adhesion section and a non-adhesion section, which are on two surfaces of an insulation plate of a rechargeable battery according to an embodiment.

Referring to FIG. 12, an insulation plate 963 according to another embodiment has a square shape having four sides. Also, an adhesion section 963a may have a rectangle shape in which centers of two sides facing each other are connected to each other. For example, the adhesion section 963a may have a rectangle shape in which two sides vertically facing each other are vertically connected to each other. Non-adhesion sections 963b may be located outside the adhesion section 963a having the rectangle shape.

Figure 13:
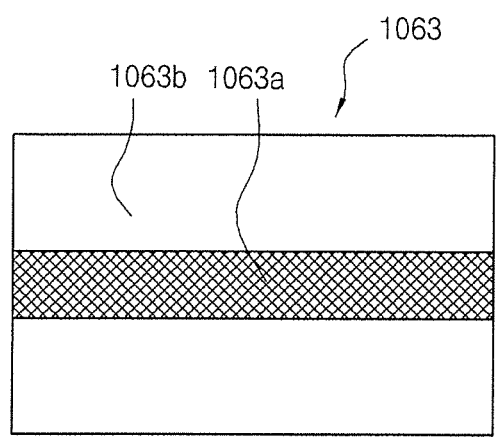
FIG. 13 illustrates a plan view of another example of an adhesion section and a non-adhesion section according to still another embodiment.

FIG. 13 illustrates a plan view of another example of an adhesion section and a non-adhesion section, which are on two surfaces of an insulation plate of a rechargeable battery according to an embodiment.

Referring to FIG. 13, an insulation plate 1063 according to another embodiment has a square shape having four sides. Also, an adhesion section 1063a may have a rectangle shape in which centers of two sides facing each other are connected to each other. For example, the adhesion section 1063a may have a rectangle shape in which two sides horizontally facing each other are horizontally connected to each other. Non-adhesion sections 1063b may be located outside the adhesion section 1063a having the rectangle shape.

Figure 14:
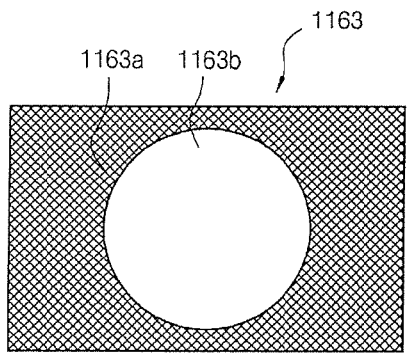
FIG. 14 illustrates a plan view of another example of an adhesion section and a non-adhesion section according to yet another embodiment.

FIG. 14 illustrates a plan view of another example of an adhesion section and a non-adhesion section, which are on two surfaces of an insulation plate of a rechargeable battery according to an embodiment.

Referring to FIG. 14, an insulation plate 1163 according to another embodiment has a square shape having four sides. Also, a non-adhesion section 1163b may have a circular shape at a central portion of the insulation plate 1163. An adhesion section 1163a may be located outside the non-adhesion section 1163b having the circular shape.

As described above, in the insulation plates of FIGS. 8 through 14, the first conductive plate and the second conductive plate are adhered and supported by the adhesion section. Also, the contact resistance between the first conductive plate and the second conductive plate is reduced by the non-adhesion section when the rechargeable battery is punctured or collapsed.

Figure 15:
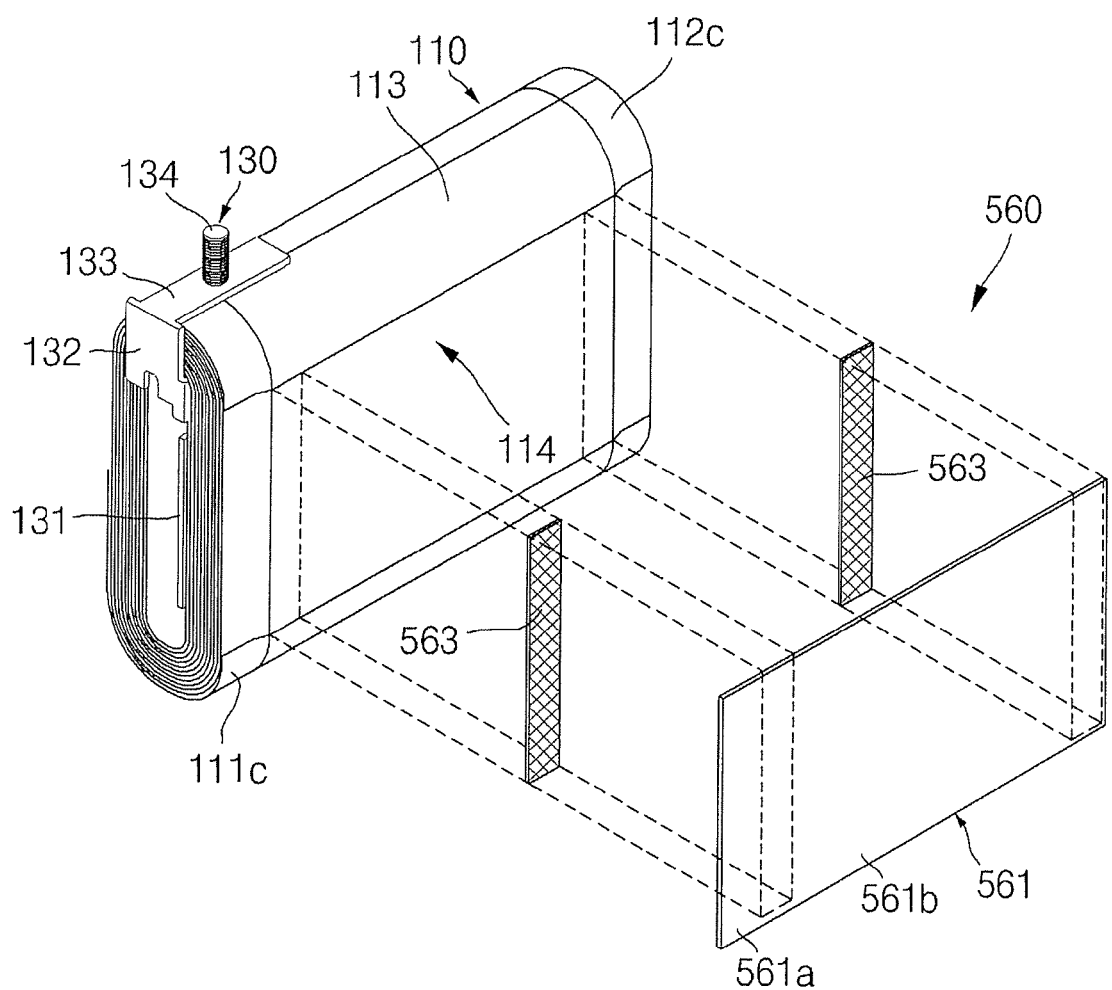
FIG. 15 illustrates perspective views of a relationship between an electrode assembly and a support plate in a rechargeable battery according to yet another embodiment.

FIG. 15 illustrates perspective views of a relationship between an electrode assembly and a support plate in a rechargeable battery according to yet another embodiment.

Referring to FIG. 15, a support plate 560 includes a first conductive plate 561 and an adhesive 563 interposed between the first conductive plate 561 and an electrode assembly 110.

The first conductive plate 561 is electrically coupled to a first non-coating portion 111c of a first electrode 111. In addition, the first conductive plate 561 includes a first section 561a welded to the first non-coating portion 111c of the electrode assembly 110 and a second section 561b extending from the first section 561a and covering a front wide side surface 114 of the electrode assembly 110. Here, the second section 561b of the first conductive plate 561 is closely attached to a separator 113 formed on the front wide side surface 114.

The adhesive 563 is coated on the second section 561b of the first conductive plate 561 such that the second section 561b of the first conductive plate 561 is adhered to the front wide side surface 114 of the electrode assembly 110. The adhesive 563 may be coated on two sides of the second section 561b of the first conductive plate 561 facing each other. However, embodiments of the present invention are not limited to the exemplary adhesive 563 illustrated herein, and all the exemplary shapes of the adhesion sections illustrated above may also be applied to the adhesive 563.

As described above, according to yet another embodiment of the present invention, a support plate having a simplified construction is provided, which may improve the safety of the rechargeable battery against puncture and collapse.

Figure 16:
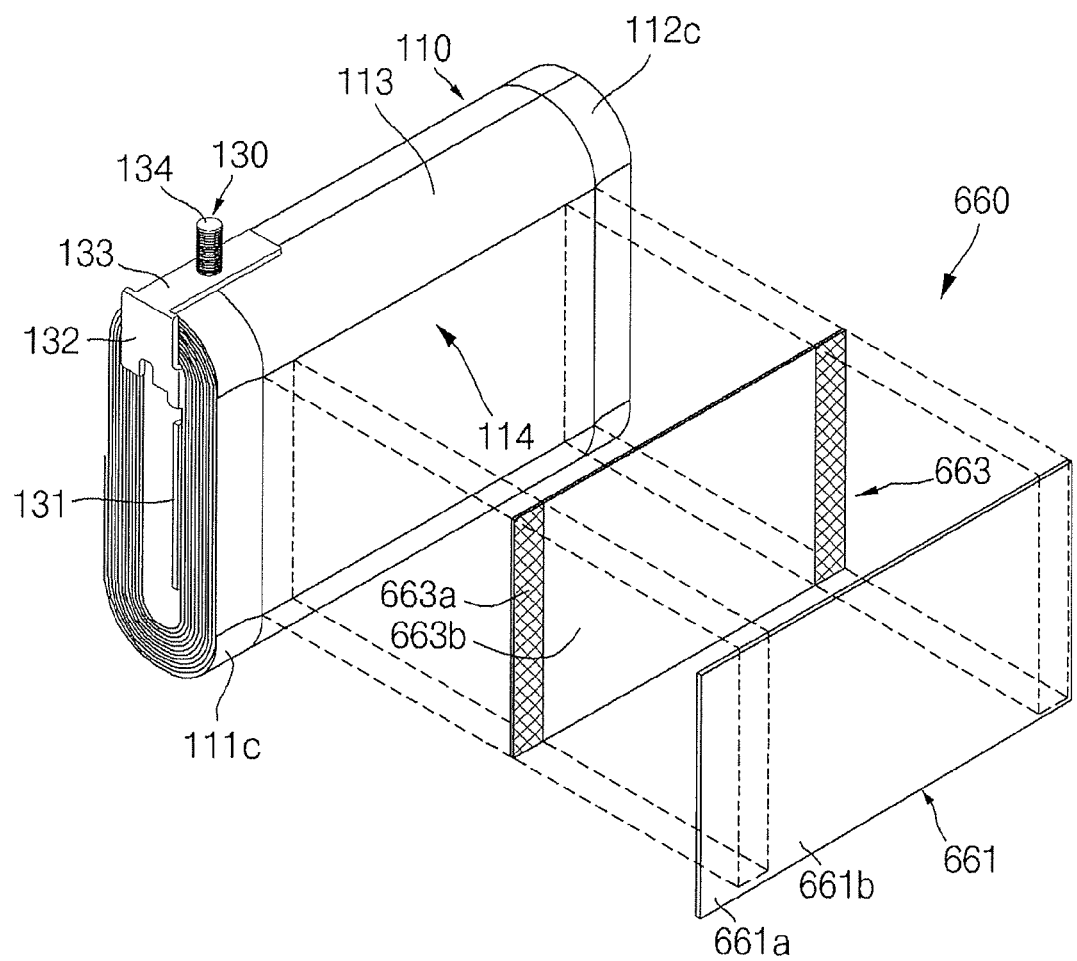
FIG. 16 illustrates perspective views of a relationship between an electrode assembly and a support plate in a rechargeable battery according to yet another embodiment.

FIG. 16 illustrates perspective views of a relationship between an electrode assembly and a support plate in a rechargeable battery according to yet another embodiment.

Referring to FIG. 16, a support plate 660 includes a first conductive plate 661 and an insulation plate 663. The first conductive plate 661 is electrically coupled to a first non-coating portion 111c of a first electrode 111. In addition, the first conductive plate 661 includes a first section 661a welded to the first non-coating portion 111c of the electrode assembly 110 and a second section 661b extending from the first section 661a and covering a front wide side surface 114 of the electrode assembly 110. Since the insulation plate 663 includes an adhesion section 663a and a non-adhesion section 663b on its surface facing the first conductive plate 661 and the electrode assembly 110, the first conductive plate 661 is stably supported to the electrode assembly 110. That is to say, the adhesion section 663a is formed on the second section 661b of the second conductive plate 661 such that the second section 661b of the second conductive plate 661 is adhered to the front wide side surface 114 of the electrode assembly 110. Here, the adhesion section 663a may be formed on two sides of the second section 661b of the first conductive plate 661 facing each other. However, embodiments of the present invention are not limited to the exemplary adhesion section 663a illustrated herein, and all the exemplary shapes of the adhesion sections illustrated above may also be applied to the adhesion section 663.

As described above, according to yet another embodiment of the present invention, a support plate having a simplified construction is provided, which may improve the safety of the rechargeable battery against puncture and collapse.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

DESCRIPTION OF THE SYMBOLS IN MAIN PORTIONS OF THE DRAWINGS

| | |
|---|---|
| 100: Rechargeable battery | 111: First electrode |
| 110: Electrode assembly | 111b: First active material |
| 111a: First metal foil | 112: Second electrode |
| 111c: First non-coating portion | 112b: Second active material |
| 112a: Second metal foil | 113: Separator |
| 112c: second non-coating portion | 121a, 121b: Wide side surfaces |
| 120: Case | 123: Bottom surface |
| 122a, 122b: narrow side surfaces | 131: Weld part |
| 130: First electrode terminal | 133: Second extension part |
| 132: First extension part | 135: Nut |
| 134: Bolt extension part | 141: Weld part |
| 140: Second electrode terminal | 143: Second extension part |
| 142: First extension part | 145: Nut |
| 144: Bolt extension part | 151a, 151b: Insulation materials |
| 150: Cap plate | 153: Safety vent |
| 152: Electrolyte plug | 161: First conductive plate |
| 160: Support plate | 161b: Second section |
| 161a: First section | 162a: First section |
| 162: Second conductive plate | 163: Insulation plate |
| 162b: Second section | 163b: Non-adhesion section |
| 163a: Adhesion section | |

What is claimed is:

1. A rechargeable battery comprising:
   a case;
   an electrode assembly housed in the case, wherein the electrode assembly comprises a first electrode, a second electrode and a separator between the first electrode and the second electrode; and
   a support structure between the electrode assembly and the case, the support structure comprising a first conductive plate directly welded to the electrode assembly and a second conductive plate directly welded to the electrode assembly;
   wherein an insulation layer is between the first conductive plate and the electrode assembly, wherein an adhesive section and a non-adhesive section are between the insulation layer and the first conductive plate, and wherein the adhesive section fixedly couples the insulation layer to the first conductive plate.

2. The rechargeable battery of claim 1, wherein the separator comprises the insulation layer.

3. The rechargeable battery of claim 1, wherein the insulation layer is adhered to the first conductive plate.

4. The rechargeable battery of claim 3, wherein the first conductive plate is adhered to the electrode assembly.

5. The rechargeable battery of claim 1, wherein the insulation layer is between the first and second conductive plates.

6. The rechargeable battery of claim 1, wherein the first electrode has a first coating portion containing an active material coated on the first plate and a first non-coating portion absent the active material and wherein the first conductive plate is electrically coupled to the first non-coating portion.

7. The rechargeable battery of claim 1, wherein the adhesive section extends generally along at least one edge of at least one planar surface of the insulation layer.

8. The rechargeable battery of claim 1, wherein the adhesive section extends generally along two edges of at least one planar surface of the insulation layer.

9. The rechargeable battery of claim 1, wherein the adhesive section extends generally along four edges of at least one planar surface of the insulation layer.

10. The rechargeable battery of claim 1, wherein the adhesive section is not continuous.

11. The rechargeable battery of claim 1, wherein the adhesive section is on two planar surfaces of the insulation layer.

12. The rechargeable battery of claim 1, wherein the adhesive section includes adhesive on only corners of at least one planar surface of the insulation layer.

13. The rechargeable battery of claim 1, wherein the adhesive section extends generally from a first edge to a second edge of at least one planar surface of the insulation layer.

14. The rechargeable battery of claim 1, wherein the non-adhesive section is a substantially circular shape.

15. The rechargeable battery of claim 1, wherein the first conductive plate and the second conductive plate comprise different materials.

16. The rechargeable battery of claim 1, wherein the first conductive plate comprises copper and the second conductive plate comprises aluminum.

17. The rechargeable battery of claim 1, further comprising an additional support plate structure electrically coupled to the electrode assembly.

18. The rechargeable battery of claim 1, further comprising an additional electrode assembly electrically coupled to the support plate.

19. The rechargeable battery of claim 1, wherein the separator and the insulation plate comprise substantially the same material.

* * * * *

UNITED STATES PATENT AND TRADEMARK OFFICE
CERTIFICATE OF CORRECTION

PATENT NO.        : 8,586,236 B2          Page 1 of 1
APPLICATION NO.   : 12/855417
DATED             : November 19, 2013
INVENTOR(S)       : Yoontai Kwak et al.

It is certified that error appears in the above-identified patent and that said Letters Patent is hereby corrected as shown below:

In the Claims

Column 14, Claim 17, line 40          Delete "plate"

Signed and Sealed this
Twenty-sixth Day of May, 2015

Michelle K. Lee
*Director of the United States Patent and Trademark Office*